US012358387B2

United States Patent
Tong (10) Patent No.: US 12,358,387 B2
(45) Date of Patent: Jul. 15, 2025

(54) POWER SUPPLY APPARATUS AND NETWORKS THEREOF

(71) Applicant: Yui Lung Tong, Hong Kong (HK)

(72) Inventor: Yui Lung Tong, Hong Kong (HK)

( * ) Notice: Subject to any disclaimer, the term of this patent is extended or adjusted under 35 U.S.C. 154(b) by 696 days.

(21) Appl. No.: 17/607,047

(22) PCT Filed: Apr. 29, 2020

(86) PCT No.: PCT/IB2020/054015
§ 371 (c)(1),
(2) Date: Oct. 28, 2021

(87) PCT Pub. No.: WO2020/222127
PCT Pub. Date: Nov. 5, 2020

(65) Prior Publication Data
US 2022/0242261 A1   Aug. 4, 2022

(30) Foreign Application Priority Data
Apr. 30, 2019   (HK) ................. 19123152.1

(51) Int. Cl.
*H02J 7/00*   (2006.01)
*B60L 53/31*   (2019.01)
*B60L 53/60*   (2019.01)
*B60L 58/12*   (2019.01)
*H02J 7/14*   (2006.01)

(52) U.S. Cl.
CPC ............ *B60L 53/31* (2019.02); *B60L 53/60* (2019.02); *B60L 58/12* (2019.02)

(58) Field of Classification Search
CPC .......... B60L 53/31; B60L 53/60; B60L 58/12
USPC ........................................................ 320/134
See application file for complete search history.

(56) References Cited

U.S. PATENT DOCUMENTS

| | | | | |
|---|---|---|---|---|
| 4,475,075 A * | 10/1984 | Munn | ..................... | B60L 53/57 |
| | | | | 174/DIG. 20 |
| 5,616,968 A * | 4/1997 | Fujii | ................. | H02J 7/007182 |
| | | | | 307/66 |
| 7,626,356 B2 * | 12/2009 | Elgie | ................... | H01R 31/065 |
| | | | | 320/103 |
| 10,040,363 B2 * | 8/2018 | Beaston | .................. | H02J 3/322 |
| 11,444,464 B1 * | 9/2022 | Ford | .................. | G05B 19/0426 |
| 2007/0126401 A1 * | 6/2007 | Chen | ..................... | H02J 7/0068 |
| | | | | 320/130 |

(Continued)

OTHER PUBLICATIONS

International Search Report of PCT Patent Application No. PCT/IB2020/054015 issued on Aug. 31, 2020.

*Primary Examiner* — Alexis B Pacheco (57) ABSTRACT

A power supply apparatus and a power supply network comprising a plurality of networked power supply apparatus in data communication with a network controller and in power interconnection are disclosed. The plurality of networked apparatus are power connected such that a networked apparatus is configured as a second power source of another networked apparatus or other networked apparatuses, wherein the network controller is configured to collect state of charge information from each member apparatus of the network, to provide available charging speed options at each networked apparatus for user selection, and to select the power output scheme according to the charging speed option selected and the state of charge information.

20 Claims, 5 Drawing Sheets

(56) References Cited

U.S. PATENT DOCUMENTS

| | | | |
|---|---|---|---|
| 2008/0116748 A1* | 5/2008 | Yeh | H02J 7/0042 |
| | | | 307/66 |
| 2009/0296442 A1* | 12/2009 | Chang | H02J 7/342 |
| | | | 320/105 |
| 2012/0044843 A1* | 2/2012 | Levy | H02J 13/00002 |
| | | | 370/310 |
| 2012/0161699 A1 | 6/2012 | Chiang et al. | |
| 2013/0020993 A1* | 1/2013 | Taddeo | B60L 53/65 |
| | | | 320/109 |
| 2013/0043826 A1* | 2/2013 | Workman | H01M 10/465 |
| | | | 307/18 |
| 2013/0314037 A1* | 11/2013 | Caffy | H02J 7/0071 |
| | | | 320/109 |
| 2014/0084874 A1* | 3/2014 | Eger | H02J 3/144 |
| | | | 320/137 |
| 2016/0101704 A1* | 4/2016 | McCalmont | B60L 53/51 |
| | | | 320/101 |
| 2016/0214492 A1 | 7/2016 | Spesser | |
| 2017/0368949 A1* | 12/2017 | Layden | B60L 53/11 |
| 2019/0013686 A1* | 1/2019 | Ma | H02J 7/0044 |
| 2020/0062138 A1* | 2/2020 | Smolenaers | B60L 55/00 |
| 2020/0086747 A1* | 3/2020 | Bhat | B60L 53/67 |
| 2021/0354578 A1* | 11/2021 | Kirschner | B60L 53/53 |

* cited by examiner

POWER SUPPLY APPARATUS AND NETWORKS THEREOF

FIELD

The present disclosure relates to power supply apparatus, and more particularly to power charging apparatus for charging mobile equipment such as electrical vehicles ("EV") and networks thereof.

BACKGROUND

Electrical energy is considered relatively green and has been increasingly used to replace fossil fuels to provide power for operation of mobile machines such as vehicles. A mobile machine which is powered by electrical energy typically has a mobile energy bank which is to store electrical energy and to operate the mobile machines using the stored electrical energy. A mobile energy bank needs to be charged from time to time in order to replenish stored energy to ensure continued operation of a mobile machine. A modern electric powered mobile machine typically has on-board circuitries to facilitate replenishing of on-board stored energy at different charging speeds. For example, a Tesla® can be replenished (i.e., charged) at a level 1 rate of 1.4 kW at 120V and 15-20 A, at a level 2 of 3.7-17.2 kW at 240V and up to 80 A, and at 140 kW at 480V and 300 A. IEC 6185-1 specifies a plurality of charging modes, including a first mode (IEC mode 1) which is to provide a charging current via a standard socket outlet, which for BS1363 is 13 A; a second mode (IEC mode 2) which is to provide a charging current of up to 32 A; a third mode (IEC mode 3) which is to provide a higher charging current than mode 2, for example, 32 A at 220V (7 kW) or 380V (12 kW), or 63 A at 380V (24 kW); and a fourth mode of between 20 kW and 120 kW. The CHAdeMO 2.0 specification allows for up to 400 kW charging by 1000V, 400 A direct current (DC).

Mobile machines usually replenish their on-board stored energy at charging stations, and charging stations are typically connected to a power grid. A power grid provides a running supply of electrical energy but typically requires a power supply infrastructure which is preapproved and permanently installed at a fixed location. A power grid is capable of providing a running (or "endless") supply of electrical energy in the sense that the energy supply is not limited by the storage capacity of an electrical energy bank such as batteries.

With the increasing popularity of electrical vehicles, charging stations are now installed in many car parks, for example, car parks in residential areas, office areas and commercial areas such as shopping malls. It is observed that charging stations at most car parks are not always in use and it is desirable to enhance utility of charging stations.

SUMMARY

A power supply apparatus comprising a battery assembly, control circuitries, and power circuitries is disclosed. The power supply apparatus may be configured as a charging station for charging a mobile load such as an electrical vehicle.

The control circuitries comprise a controller, a data communication frontend, a user-interface frontend, and battery management circuitries;

The controller is configured to cooperate with the battery management circuitries to form a battery management system, to determine and collect battery parameters including state of charge of the battery assembly, and to select a power output scheme from a plurality of power output schemes available for outputting power from the apparatus;

The power circuitries comprise: a power input circuitry comprising a first input circuitry configured for connection to a first power source and a second input circuitry configured for connection to a second power source, the first power source and the second power source being separate and independent power sources; a charging circuitry configured to receive power from the first input circuitry to charge the battery assembly; and a power output circuitry configured to output power from the apparatus.

The power circuitries are operable to define a plurality of power output schemes by selective combination of a plurality of power components or selecting one power component form the plurality of power components for outputting power from the apparatus.

The power circuitries are operable to combine two or more power components selected from a group of power components for power output from the apparatus upon receipt of a machine instruction containing a first charging speed, the group of power components comprising a first power component P1 which is a power component due to the first power source, a second power component which is a power component due to the second power source P2, and a third power component P3 which is a power component due to the battery assembly which is a stored energy source.

A power supply network comprising a plurality of networked apparatus in data communication with a network controller and in power connection is disclosed.

The networked apparatus is a power supply apparatus according to the present disclosure.

The plurality of networked apparatus are power connected such that a networked apparatus is configured as a second power source of another networked apparatus or other networked apparatuses, wherein the network controller is configured to collect state of charge information from each member apparatus of the network, to provide available charging speed options at each networked apparatus for user selection, and to select the power output scheme according to the charging speed option selected and the state of charge information.

A method of operating a plurality of power supply apparatuses is disclosed. The power supply apparatuses are connected to a network controller to form a networked cluster of charging stations. Each power supply apparatus is a member apparatus comprising a battery assembly, power circuitries and control circuitries. The power circuitries comprises a first power input connected to a first power source to receive a first power component at a first power rate, a second power input connected to a second power source to receive a second power component at a second power rate, and the power storage assembly has a stored energy level and is configured to output a third power component at a third power rate when the stored energy level is above an output threshold. The network controller is configured to select a power output mode from a plurality of power output modes for outputting power from a power output of a member apparatus. The plurality of power output modes comprises at least an output mode in which the output power is due to a combination of the first power component, the second power component, and/or the third power component.

FIGURES

The disclosure comprises a description of embodiments and examples and is made with reference to the accompanying Figures, in which:

FIG. 1O is a block diagram of an example input circuitry portion of the apparatus of FIG. 1, FIGS. 2A and 2B are schematic block diagrams of example power supply apparatus of the present disclosure.

DETAILED DESCRIPTION OF EMBODIMENTS AND EXAMPLES

Figure 1:
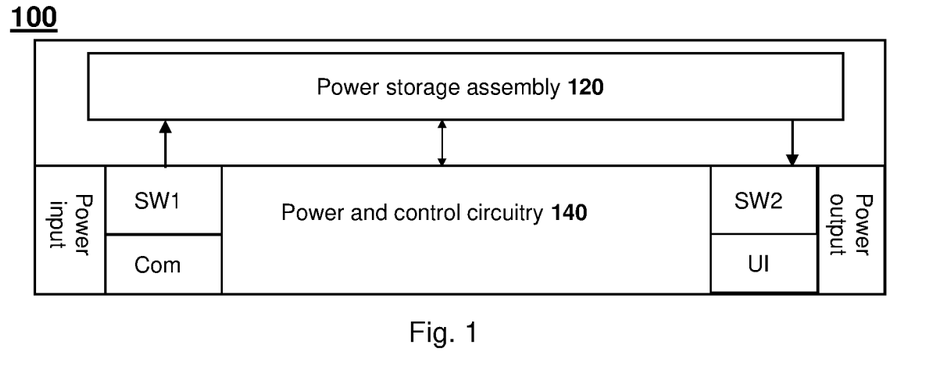
FIG. 1 is a block diagram of a power supply apparatus of the present disclosure.

A power supply apparatus 100 according to the present disclosure comprises a power storage assembly 120 and a power-and-control circuitry 140, as shown in FIG. 1. The power storage assembly 120 is devised to store power which is received from outside of the apparatus and to output power to an external load when the load is connected to the apparatus. The power-and-control circuitry 140 is an ensemble of circuitries, comprising power circuitries and control circuitries. The power circuitries and the control circuitries cooperate to manage and control operations of the apparatus 100. The power storage assembly 120 and the power-and-control circuitry 140 are electrically interconnected. The power circuitries comprise a power input for connection to an external power source and a power output for output power to an external load.

The power circuitries are devised to facilitate power-intensive operations such as power flow operations, for example, to provide power path(s) for external power to flow into the apparatus, to provide power path(s) for power to flow through and then out of the apparatus, and to provide power paths for power to flow within the apparatus. To facilitate power flow operations, the power circuitries typically comprises a power input circuitry which is connected to a power input of the apparatus, a power output circuitry which is connected to a power output of the apparatus, a charging circuitry for charging the power storage assembly 120, a power processing circuitry, and other power handling circuitries. The power processing circuitry may comprise power converter(s), power adder(s) or combiner(s), and/or power regulators. The power converter(s) may comprise a combination of one or more of: AC-AC converter(s), AC-DC converter(s), DC-DC converter(s), and/or DC-AC converters. The power input circuitry may comprise a switching circuitry SW1 and the power output circuitry may comprise a switching circuitry SW2. A switching circuitry herein may comprise electronic switches, mechanical switched or electromechanical switches or a combination thereof.

To devise paths to facilitate flow of power, the power circuitry may comprise power paths, power switches, power switching circuitries, power routers, and/or power routing circuitries.

The control circuitries are devised to control and manage power-intensive operations as well as non-power-intensive operations of the apparatus. For example, the control circuitries may be configured to operate a power router to control power flow directions and/or power input and power output combinations, to control charging and discharging of the power storage assembly, to control input and output voltage, to control input and output current and/or voltage of a power converter, and/or to control the input and/or output voltage of the power regulators.

Example of non-power-intensive control and management operations includes signaling, data communications, timing, triggering, sensing and monitoring, switching, and/or user interaction. To facilitate control and management operations, the control circuitries typically comprise a controller and peripheral circuitries. The controller may be a solid-state controller such as a microprocessor-based controller comprising a microprocessor or a plurality of microprocessors. The microprocessor-based controller may comprise solid-state memories and a hard drive or hard drives. The solid-state memories may comprise non-volatile memories such as ROM and/or EPROM and volatile memories such as RAM. The plurality of microprocessors may be configured as a cluster of solid-state processors or as a plurality of stand-alone solid-state processors. In some embodiments, the microprocessors may comprise a master processor and/or a slave processor. In example embodiments, the controller may be a logic-device based controller comprising logic arrays such as programable logic array ("PLA"). In example embodiments, the controller may comprise both a microprocessor or microprocessors logic devices and logic devices. The controller may be formed on a printed circuit board (PCB) or a plurality of PCBs. In example embodiments, the apparatus comprises a rigid main housing and the power storage assembly 120 and a power-and-control circuitry 140 are mounted inside the main housing.

To facilitate control and management of apparatus operations, the peripheral circuitries may comprise non-power-intensive circuitries such as signaling circuitries including signal receivers and signal transmitters, data communication frontend ("COM") comprising data communications circuitries and data buses, timing circuitries, triggering circuitries, sensing and monitoring circuitries, switching circuitries, data storage devices comprising volatile and non-volatile solid-state memories, and/or user interface ("UI") devices such as touch panels, near-field communication ("NFC") sensors.

To facilitate control and management of the power storage assembly, including charging and discharging operations, the main controller may be configured to cooperate with the peripheral circuitries to form a management system, the management system may comprises sub-systems such as a power management system ("PMS") for performing power management functions, a battery management system ("BMS") for performing battery management functions, and/or use management system ("UMS") for performing user related management functions such as use authorization, payment authorization, etc.

A non-power-intensive circuitry herein means the circuitry is devise to operate at a power which is significantly less than the rated power of the apparatus, for example, less than 0.001%, 0.05% or 0.01% of the rated power as a rule of thumb, which may be the rated input power or the rated output power. A non-power-intensive circuitry herein is usually a non-current-intensive circuitry. A circuitry or operation is non-current-intensive if the current which flows in the circuitry during normal operations is significantly less than the rated current of the apparatus, for example, less than 0.001%, 0.05% or 0.1% of the rated current as a rule of thumb, which may be the rated input current or the rated output current.

The term "power" herein means electrical power, the term "connect" herein means physically and electrically connect, and the term "connection" means physical and electrical connection unless the context otherwise requires. Although the term power means energy per unit time, the term power herein also means energy in accordance with conventional usage of the general public. Therefore, terms "energy" and "power" herein have the same meaning and are used interchangeably, unless the context requires strict differentiation.

Figure 1A:
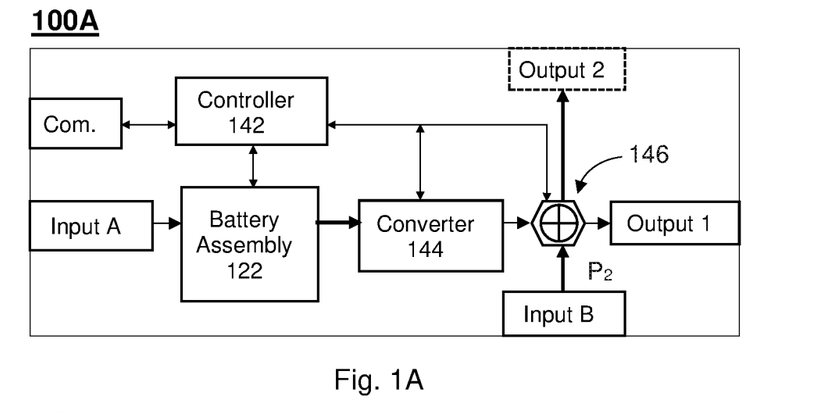
FIG. 1A is a block diagram of an example power supply apparatus of the present disclosure.

An embodiment of the power supply apparatus 100 according to the present disclosure is shown in FIG. 1A as an example power supply apparatus 100A. The apparatus 100A comprises a battery assembly 122 as an example of a power storage assembly 120. The power circuitries of the apparatus 100A comprise a first power input A, a second power input B, a power converter 144, a power adder 146, a power output 1, and other supporting circuitries not shown in the figure. The control circuitries of the apparatus 100A comprise a controller 142, a communication frontend (Com), a user interaction (UI) frontend, and other supporting circuitries such as sensing circuitries not shown in the figure. The controller 142 cooperates with the supporting circuitries to form a BMS. The BMS is configured to monitor parameters of the battery assembly, including for example, temperature, voltage, current, duration of charging and/or discharging, state of health (SoH), and state of charge (SoC). The power adder 146 comprises a power summing circuitry so that powers connected to the inputs of the power adder can be selectively added for output by the power output circuitry.

Figure 2A:
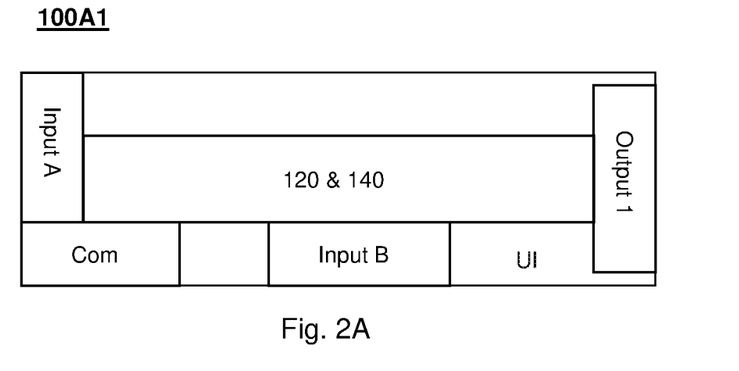
Figure 2B:
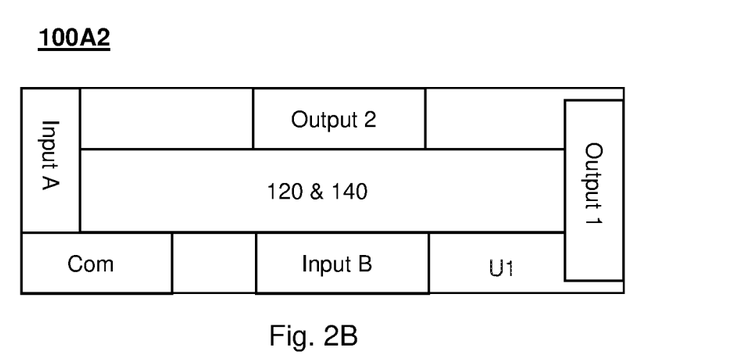

Power output 1, is a first power output port. A power output port (or "power output" in short) is configured to output power from the power output circuitries of the apparatus. The power supply apparatus 100 may have a second power output, output 2, which is an optional power output. The second power output may be connected to an output port of the power output circuitries which is isolated from the output port which supplies output power to the first power output or may share a common output port with the first power output port. The second power output may be used to supply power to another mobile load when the first power output is occupied, or to supply power to another power supply apparatus or other power supply apparatuses when connected to a network of supply power apparatuses. The apparatus 100, 100A, 100B may or may not have a second power output, that is, Output 2, as shown in FIGS. 2A and 2B.

The battery assembly is connected to a power input port, input A. A power input port (or "power input" in short) is configured to receive external power and feed the received power through the power input circuitries of the apparatus. Power for charging the battery assembly 122 is supplied to the battery assembly when input A is connected to a running power source. The battery assembly is also connected to an input of the power converter. The power adder is connected to the power converter, input B, output 1, and output 2 (where output 2 is available). The power converter and input B are connected to inputs of the power adder while the output(s) (output 1 plus output 2 (where output 2 is available) is/are connected to an output or outputs of the power adder.

A rechargeable battery typically has a maximum working voltage ($V_{cell\_max}$ or maximum voltage in short), a minimum voltage ($V_{cell\_min}$ or minimum voltage in short), and a nominal voltage ($V_{cell}$). A battery assembly has a useable energy capacity of E kwh which is the difference between the maximum stored energy of $E_{max}$ at $V_{max}$ and the minimum stored energy of $E_{min}$ at $V_{min}$, where $V_{max}$ and $V_{min}$ are, respectively, the maximum working voltage and the minimum working voltage of the battery assembly. SoC is expressed in percentage terms of the maximum stored energy of a battery assembly and a battery assembly at $E_{max}$ has an SoC of 100%.

A BMS is typically configured to perform battery management functions, including charging a battery assembly according to a prescribed charging scheme, monitoring battery parameters, preventing over-charging of a battery above $V_{cell\_max}$, preventing over-discharging of a battery below $V_{cell\_min}$, monitoring the state of stored energy, for example, total stored energy or useable energy. For example, an nSmP battery assembly has a nominal voltage of $nV_{cell}$ and an stored energy of $n \times m \times E_{cell}$, where $E_{cell}$ is the energy storage capacity of a cell.

Figure 1B:
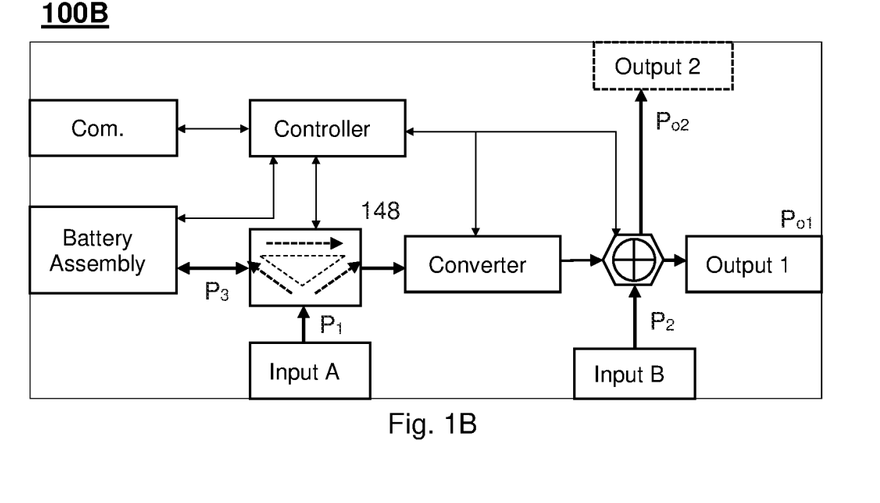
FIG. 1B is a block diagram of an example power supply apparatus of the present disclosure.

An embodiment of the power supply apparatus 100 is shown in FIG. 1B as an example power supply apparatus 100B. The power supply apparatus 100B is substantially identical to the power supply apparatus 100A except that the power converter and the battery assembly of the apparatus 100B are interconnected by a switchable power router 148. The description herein in relation to the power supply apparatus 100A is incorporated herein by reference and to apply mutatis mutandis to the apparatus 100B. The switchable power router defines a plurality of power paths, including a first path which is from input A to the battery assembly, a second path which is from the battery assembly to the power converter, and a third path which is from input A to the power converted. The switchable power router is controlled by the controller and the controller is configured to select one or more of the plurality power-paths. For example, the controller may operate to switch the power router so that power only flows in the first path, only in the second path, only in the third path, or in both the second path and the third path. In some embodiments, the battery assembly comprises built-in switching circuitries and the switchable power router may be incorporated as part of the battery assembly in which case the power supply apparatus 100B may be regarded as an example embodiment of the power supply apparatus 100A. The power adder 146 may form as a power adder module or may comprise a plurality of power adder components which are distributed in different modules. In example embodiments, the components may comprise a plurality of summing circuitries which are distributed, for example, on a power circuitries module and/or elsewhere. The power router 148 may form as a power router module or may comprise a plurality of power routing components which are distributed in different modules. The discrete circuitries of the power adder 146 and/or the discrete circuitries of the power router 148 may be distributed inside a power circuitries module, inside a battery module, partly inside a power circuitries module and partly inside a battery module, and/or partly inside the apparatus main housing and outside the power circuitries module and outside the battery module, or elsewhere.

Figure 1C:
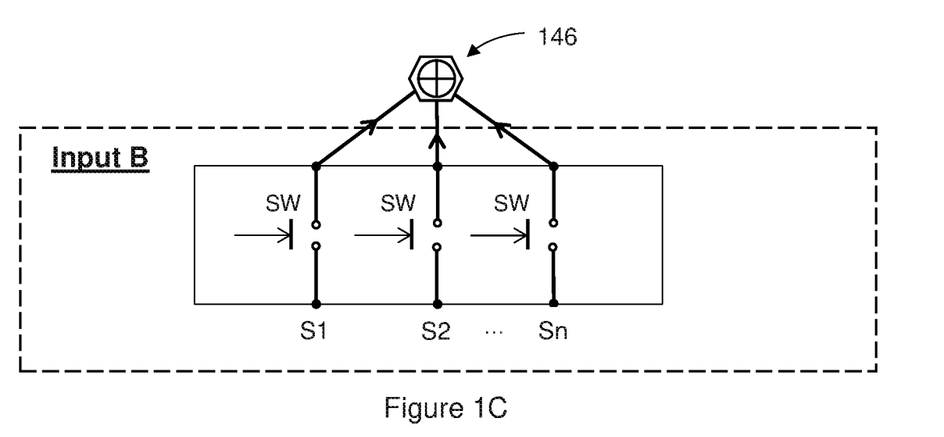

Input B of the apparatus 100, 100A, 100B is a portion of the power input circuitry, and may comprise a plurality of switchable inputs S1, S2, ..., Sn, as shown in FIG. 1C. Each of the switchable input has a switchable power path which is controlled by the controller, for example, via a control bus, between an open state (which is broken or non-current-conductive) and a closed state (which is current-conductive). The switchable inputs are selectively activatable to connect one or a plurality of external powers sources simultaneous to input B so that power input to the power adder 146 may comprise power components due to the one or a selected plurality of external power sources. Each of the switchable power path has a power switch SW and the multiple power switches can be selectively operated to selectively activate one or more of the power paths switchable power paths.

The apparatus 100 is configured to be operable in an idling state and an output state. When in the idling state, the apparatus is configured such that incoming power which is received from input A is stored in the power storage assembly 120 until the power storage assembly 120 is fully charged, and the apparatus does not supply output power to an external load connected to the output of the apparatus. When in the output state, the apparatus is configured to operate in one of a plurality of output modes so that to output power can be delivered by the apparatus to an external load which is connected to the output of the apparatus.

The apparatus 100 is configured to initialize in the idling state and is to stay in the idling state until the it enters into the power output state. The apparatus 100 is to enter into the power output state when an authorized request for power output is received and confirmed by the controller or when an instruction to supply power is received by the controller while in the idling state. The apparatus 100 is configured to return to the idling state when all the confirmed power output requests have been served, completed or ended. The instruction to supply power may be a machine instruction sent by a master controller or a network controller when the apparatus is a member of a power supply network.

In first example applications, input A of the apparatus is connected to a first power source which is a live power source and input B is not connected to a live power source. In the first example applications, the plurality of output modes comprises a first mode (or mode 1) in which the available output power is due to the first power source only; a second mode (or mode 2) in which the available output power is a third power component P3 due to the power storage assembly 120 only; and a third mode (or mode 3) in which the available output power is due to both the first power source and stored power due to the power storage assembly 120. A live power source herein means a power source which is turned on and a non-live power source is one which is not turned on. A live power source and a non-live power source are also referred to respectively as an active power source and a non-active power source herein.

In second example applications, input A of the apparatus is connected to a first power source which delivers a first power component P1 and input B is connected to a second power source which delivers a second power component P2, both the first power source and second power sources are live powers sources. In the second example applications, the power output of the apparatus comprises (as set out in the Table below):

A first mode (mode 1) in which the available output power is due to the first power component P1 only; a second mode (mode 2) in which the available output power is due to the third power component P3 only; and a third mode (mode 3) in which the available output power is due to the first power component P1 and the third power component P3 only; a fourth mode (mode 4) in which the available output power is due to the first power component P1, the second power component, and the third power component P3; a fifth mode (mode 5) in which the available output power is due to the first power component P1, the second power component, but not the third power component P3; a sixth mode (mode 6) in which the available output power is due to the second power component, the third power component P3, but not the first power component P1; and a seventh mode (mode 7) in which the available output power is due to the second power component P2 only.

TABLE 1

| Output mode # | Power components | | |
|---|---|---|---|
| | P1 | P2 | P3 |
| 1 | ✓ | X | X |
| 2 | X | X | ✓ |
| 3 | ✓ | X | ✓ |
| 4 | ✓ | ✓ | ✓ |
| 5 | ✓ | ✓ | X |
| 6 | X | ✓ | ✓ |
| 7 | X | ✓ | X |

Figure 3:
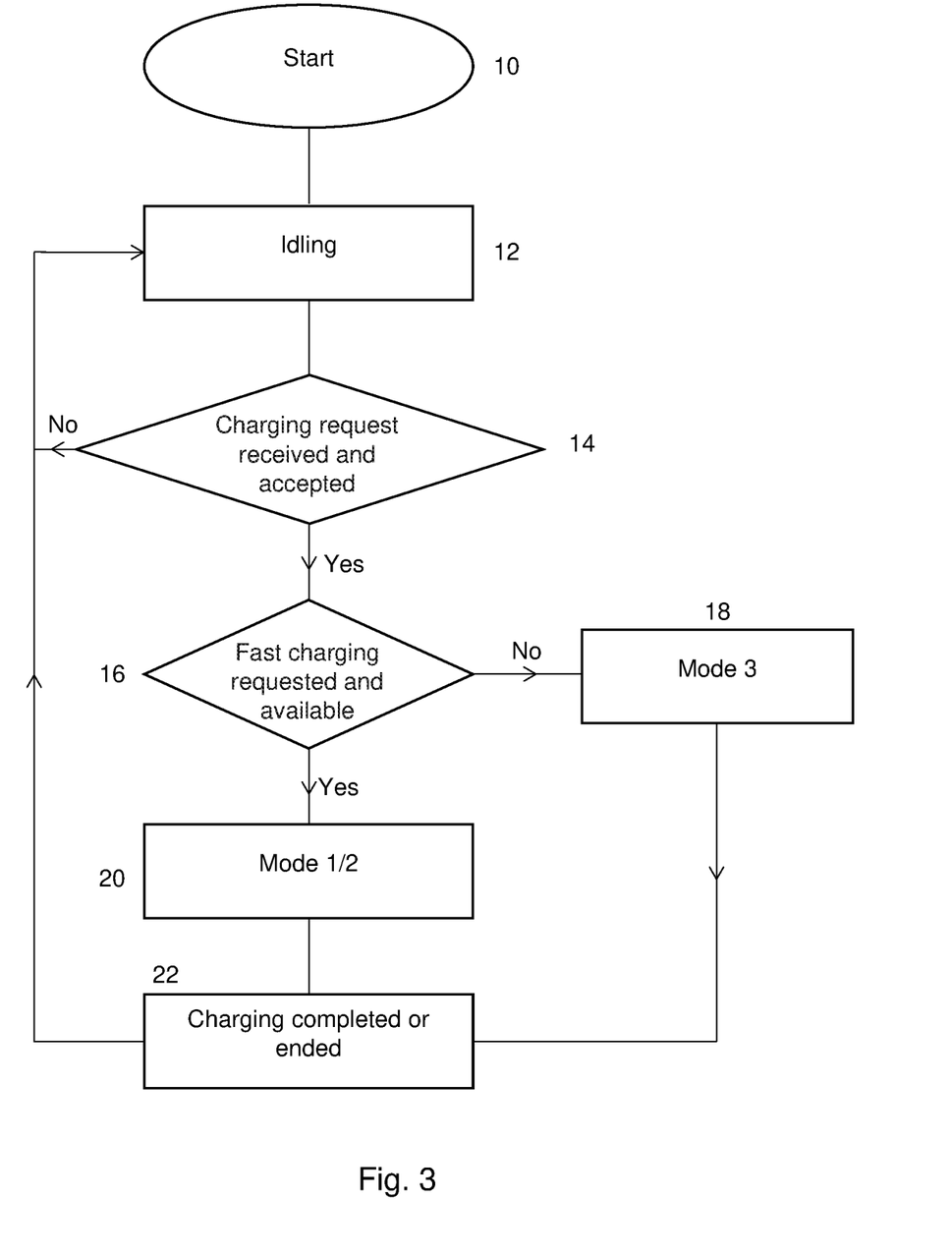
FIG. 3 is a flowchart showing example operation flows of the example apparatus of the present disclosure.

The apparatus 100 may be configured to operate according to the flow diagram of FIG. 3.

On power up at 10, the controller 142 is to execute stored instructions and perform a set of start-up procedures, including internal diagnostic checks, power and power connection checks, network connection checks etc. After the start-up procedures have been completed, the apparatus 100 is to enter into the idling state 12 and is ready to accept power supply request and to supply power to an external load. When the controller receives a power supply request, the controller is to perform an update check on its power status and its connected power sources, and to determine at 14 whether the request is acceptable. If the request is acceptable, the controller will provide power output options for selection, for example, by a user through a UI frontend at 16. The power output options available for selection may comprise options for "fast charging" or "standard-rate charging". If a request for standard-rate charging is detected (or a request for fast charging is not detected) at 16 by the controller, the controller will proceed to standard charging operations (mode 3 charging) at 18. If a request for fast charging is detected at 16 by the controller, the controller will proceed to fast charging operations (mode 1 or mode 2 charging) at 20. Charging will continue until end of the charging process at 22.

Figure 4:
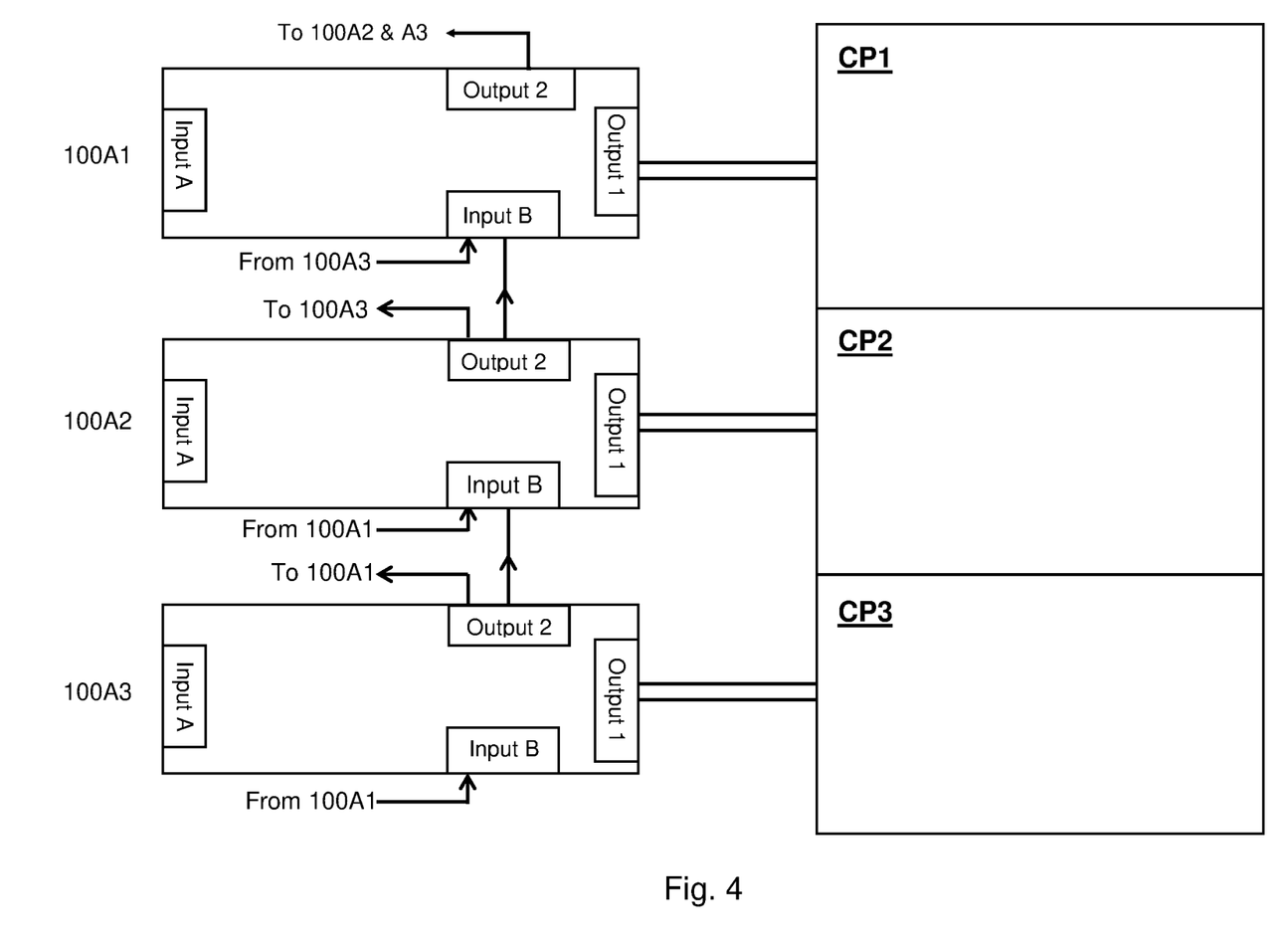
FIG. 4 is a schematic block diagram showing an example power supply network according to the present disclosure.

In example deployments, a plurality of member apparatuses is connected to form a network of power supply apparatus, as shown in FIG. 4. Each member apparatus of a network is a power supply apparatus of the present disclosure. The example network comprises an example plurality of three example apparatus, namely, a first apparatus 100A1, a second apparatus 100A2, and a third apparatus 100A3. Each member apparatus 100A1, 100A2, 100A3 is a power supply apparatus having the example configurations of the apparatus 100A and the member apparatuses 100A1, 100A2, 100A3 of the network are power and data interconnected.

Input A of each apparatus 100A1, 100A2, 100A3 is connected to a power supply, input B of each apparatus 100A1, 100A2, 100A3 is connected to Output 2 of other members of the network (i.e., Output 2 of each apparatus 100A1, 100A2, 100A3 is connected to input B of other members of the network), and output 1 of each apparatus 100A1, 100A2, 100A3 is configured for making connection to an external load, as shown in FIG. 4.

The network comprises a network controller for management and control of the member apparatuses of the network. Each member apparatus is data connected to the network controller and power connected to one or a plurality of member apparatuses of the network. The network controller may be a standalone controller which is resident outside the apparatus or a local controller of a member apparatus which is configured as a master controller. An apparatus 100 may be configured as a master apparatus having a master controller or a slave apparatus having a slave controller. Where an apparatus 100 is configured as a master apparatus, the apparatus may have a master controller plus a slave controller or just a master controller which functions as both a local controller and a network controller. A local controller is one which monitors and controls local operations of the apparatus and a network controller is to monitor and control local operations of the apparatus. In the example network, the apparatus 100A1 is configured as a master apparatus and the apparatuses 100A2, 100A3 are configured as a slave apparatus. The master controller and the slave controllers are data connected for data communication, and the data communication may be facilitated by wired data bus or by wireless communication frontends plus internal data bus. Wherein the network has a standalone network controller, the local controllers of all the member apparatus may be configured as slave controllers. A local controller and local supporting circuitries of a member apparatus may cooperate to form a local BMS to monitor the local battery assembly, and the master controller may cooperate with the local controllers to form a network BMS. In some embodiments, the master controller may cooperate with the local supporting circuitries to form both local BMS and the network BMS.

The network controller may be configured to provide power output options for user selection. In example embodiments, the power output options may include one or more of: charging power option, charging time option, charging speed options, SoC option. The charging power option would enable a user to input or select a specific power, for example, in kWh, to be outputted. The charging time option would enable a user to input or select a specific time, for example, in minutes or hours (h) to be outputted. The charging speed option would enable a user to select one or a plurality of preset charging speeds such as "standard", "fast", "superfast". The SoC option would enable a user to select an SoC percentage to end charging. The options may be combined. For example, the network controller may allow a user to select a combination of two or more of: the charging power option, the charging time option, the SoC option; and/or to combine a combination of two or more of: a charging speed option, the charging time option, the SoC option.

In example applications, input A of each apparatus 100A1, 100A2, 100A3 is connected to a running power source. A running power source herein means a source where power is continuously supplied from a non-stored power source. A battery assembly is an example of a stored power source. The AC mains supply or a rectified output of the AC mains supply is an example of a running power source.

The network is configured to be operable in an idling state and an active power output state (or "power output state" in short). When in the idling state, no output power is expected to be supplied through the apparatus to a mobile load and power received from Input A of the apparatuses 100A1, 100A2, 100A3 is for charging the power storage assemblies 120 until all the power storage assemblies 120 are fully charged. During the idling state, the network does not deliver power to an external load through Output 1 of the member apparatuses 100A1, 100A2, 100A3. In some embodiments, the master controller may be configured such that surplus power from one apparatus may be used to charge another apparatus in the network. For example, when the local battery assembly of the first apparatus 100A1 is fully charged, power received from Input A of apparatus 100A1 is a surplus power which may be delivered from the second power output, Output 2, of apparatus 100A1 to the second power input, Input B, of the second apparatus 100A2 for charging the battery assembly of apparatus 100A2, which still requires charging. In example embodiments, surplus power of a member apparatus may be outputted to another member apparatus or other member apparatuses if the SoC of a destinated member apparatus is below a storage threshold, say, below 30%, 40%, 50%, etc.

When the network is in the power output state, each networked apparatus 100A1, 100A2, 100A3 will operate in one of a plurality of output modes. When in the networked configuration, the output power which is available for output from Output 1 of an apparatus in modes 1, 2, and 3 does not comprises power due to the second power component P2, which is power received from Input B, and each one of modes 4-7 comprises power due to the second power component P2. The output modes 1-7, are example modes and the actual modes available at an apparatus are dependent on configuration of the power circuitries as well as the controller, and may be configured on site. In other words, some output mode(s) may be available in some apparatus but not others without loss of generality. In example embodiments, a standalone, non-networked, apparatus may be connected to a second power source and some or all of modes 4 to 7 may also be available.

In an example network configuration as shown in FIG. 4, input A of one apparatus is connected to a running power source and input B is connected to output 1 of other apparatuses 100A1, 100A2, 100A3 of the network. In the example network, the example running power source is a rectified three phase (3 φ) AC power supply in which each apparatus is configured to receive a charging power at the first input power rate of $P_1$(kw) from input A, to receive power at a second input power rate of $P_2$ from input B, to output power at a first output power rate of $P_{o1}$ at Output 1 and to output power at a second output power rate of $P_{o2}$ at Output 2. Where the power storage assembly of an apparatus has a useable energy capacity of E kWh, it would require a charging time T to charge from minimum energy to maximum energy, where $T=E/P_c$ and $P_c$ is charging power in kW. For most practical considerations, the running power source is to supply the first power component at a constant power of $P_1$(kw) for an indefinite time.

The example network is configured as a network of charging stations and each apparatus is a member apparatus configured as a charging station having an EV charging gun for charging an electrical vehicle. A charging gun herein is an electrical connector for the apparatus (or more specifically, Output 1 of the apparatus) to make detachable electrical connection with an EV and vice versa. The network comprises an example plurality of three parking spaces, namely, CP1, CP2, and CP3, and each parking space has a corresponding designated EV charging apparatus. In the example, charging apparatus 100A1, 100A2, 100A3 are allocated respectively to CP1, CP2, CP3.

In example applications, the network is configured to enter the idling state after initialization and is to stay in the idling state until a machine instruction to change the network to operate in the power output state is received. In typical configurations, the network is configured to change its operation state from the idling state into the power output state when an authorized request for power output is received and confirmed by the network while in the idling state. The network and each member apparatus of the network is configured to return to the idling state when all of the confirmed power output requests have been performed, completed, interrupted, or ended.

On initialization, the network is to perform an initialization check. The initialization check may include the network controller executing machine instructions to collect network data, to determine or confirm network connection and/or network configurations, and/or to collect power connection status. To facilitate network data collection, the network would enter into data communication with the local controllers. The network data to be collected may include one or a combination of any of: number of member apparatuses in the network, identities of the member apparatuses, energy storage capacity of each member apparatus, SoC of each member apparatus, power supply status at Input A of each member apparatus, connection status at Input B of each member apparatus, connection status at Output 1 of each member apparatus, connection status at Output 2 of each member apparatus, operational status of each member apparatus, general circuitry conditions including whether the power circuitries are in good conditions and is fit for operation. Most of the network data collected are internal data of the member apparatuses. The network data collected may be used to determine whether any old member apparatuses are missing and the network controller may send a maintenance alert if an old member is not present or if a current member apparatus is not power connected or not fully power connected as configured. A current member apparatus herein means an apparatus which is on-line and in data communication with the network controller. To facilitate collection of internal data of the individual member apparatuses, the network controller would need to establish data links and enter into data communication with the local controllers of the current member apparatuses.

The operational status provides information whether each member apparatus is fit for operation. If the operational status of a member apparatus is not fit for operation, the network controller will send an alert signal and take appropriate countermeasures according to problems detected. For example, if the local BMS reports a failure of the power storage assembly of a member apparatus, the power storage assembly of the member apparatus will be isolated and disabled, the member apparatus will be taken out of operation and removed herein from the list of active apparatus. An active apparatus herein means a member apparatus which is fit and ready for power output operations.

After network initialization has completed, the network will be in the idling state. While in the idling state, the network is to repeatedly perform updated status checks, collect updated status data, and prepare updated status information, for example, at regular time intervals. The updated status data includes one or a combination of any of the instantaneous data of: SoC of each member apparatus, power supply status at Input A of each member apparatus, connection status at Input B of each member apparatus, connection status at Output 1 of each member apparatus, connection status at Output 2 of each member apparatus. The network will also provide updated information of each member apparatus for user information and for output power configuration.

After completion of the status check and data collection, the network is to store the collected data as idling state parameters and is ready to provide charging services on request and upon completion of service engagement procedures such as selection of a member apparatus, selection of a charging speed and/or charging times, and/or payments or authorization procedures. The idling state parameters may include: the stored energy level, battery assembly health conditions, power supply status, identity of active apparatuses, on network memories, The updated information may be displayed at the UI frontend and may include information on availability or otherwise of each of the member apparatuses. If a member apparatus is indicated as available, the network will also provide updated information on which charging speed options are available. The charging speed options available for user selection may include a basic option of "standard" charging plus faster charging speed options such as "fast" or "superfast". Whether the faster charging options are available for user selection would depend on a set of power parameters, for example, the SoC of a member apparatus, the SoC of neighboring member apparatuses, and the power supply conditions at input 1.

For example, if the SoC of the power storage assemblies of all the member apparatuses are at or below the minimum stored energy of $E_{min}$, only power supply at input A of the member apparatus is available for service output at Output 1, and the only service available is "standard" charging.

For example, if the SoC of the member apparatus is 100%, the SoC of all the neighboring member apparatuses are at or below the minimum stored energy of $E_{min}$, the incoming power from input A of the member apparatus and stored energy of the power storage assembly of the member apparatus are available for service output at Output 1, the charging speed options available may include the "fast" or "superfast" options, depending on the storage capacity of the power storage assembly of the member apparatus.

For example, if some, but not all, of the member apparatus is at 100% SoC, the charging speed options available may include the "fast" or "superfast" options, depending on the storage capacity of the power storage assemblies of the member apparatuses. When some of the member apparatuses are fully charged at 100% SoC, the surplus power of a fully charged member apparatus may be routed to a non-fully charged member apparatus to provide more charging speed options.

For example, if the SoC of all the member apparatuses is 100%, all the charging speed options are available for use selection.

There is no strict rule on what is to be classified as standard charging, fast charging or superfast charging. A currently accepted criteria is that a charging time of one hour (1 C rate) or below from minimum stored energy $E_{min}$ to maximum stored energy $E_{max}$ is regarded as superfast, a charging time of between six to ten hours from minimum stored energy to maximum energy is regarded as slow or standard charging, and a charging time which is intermediate the charging times required for "superfast" and "standard" charging is regarded as "fast" or "faster" charging.

When a user operates a UI frontend to request for charging of a target load which is connected to a selected active member apparatus and has selected a charging speed option while the network is in the idling state, the network controller upon detection of a charging service request, is to detect electrical connection conditions at Output 1 and enter into data communication with the BMS of the target load. When data communication between the network and the target load has been established, the network will perform an admission feasibility check to determine whether the target load is fit for charging, and if so, to collect its SoC, its charging current limit, charging voltage required, and other relevant parameters. The network may also collect identity information of the target load of identity information is available.

If the electrical connection conditions at Output 1 and the target load are fit for power output by the apparatus, the network will enter into the power output state upon completion of admittance procedures and supply output power to the target load by the selected active apparatus until charging is completed. The admittance procedure may include payment, authorization, and/or other admission formalities.

While in the power output state, the network is to repeatedly, for example, at regular time intervals, perform status checks in order to collect updated status data and to prepare updated status information, such as, charging power, charging progress, and/or remaining charging time. The network will also provide updated information of each member apparatus for user information and for output power configuration, since the instantaneous energy storage and usage of a member apparatus can affect the charging speed options available at other member apparatuses.

When a user operates a UI frontend to request for charging of a target load connected to a selected active apparatus and has selected a charging speed option while the network is in the power output state, the network will perform admission feasibility check, to perform admission procedures and to begin power output to the target load from input 1 when admission feasibility check and admission procedures have been satisfactorily completed.

When charging has completed or output of power from the member apparatus has ended, the selected active apparatus will return to the idling state, and the network will return to the idling state, unless there is another member apparatus which is in the power output state and in power output operation.

An apparatus may be configured to output power at different charging speed options using an output mode selected from a plurality of power output modes. In example embodiments, a controller may be configured to devise a power output mode according to requested charging speed option and the power parameters.

For example, output mode 1 may be set as a default output mode for standard-rate charging unless the power supply at input 1 is interrupted. When the power supply at input 1 is interrupted, in which case the apparatus is to switch to output mode 2, 6 or 7 to continue power output. If the power supply at input 1 is interrupted and the SoC of the local battery assembly is at $E_{min}$, the second power source remains the only live power supply and the apparatus will have to switch to output mode 7 to maintain power output to the external load.

For example, output modes 2 or 3 may be set as a default for fast-charging. However, if the SoC of the local battery assembly, that is, the battery assembly of a selected apparatus, is below a fast-charging energy threshold or is below a fast-discharge rate threshold required for a requested fast charging, for example, the local battery assembly does not have a useable energy which is sufficient to complete a requested fast-charging or a discharge rate which is fast enough to meet a charging time requirement of the specific fast-charging request, the controller will select one of the output modes 4-7 as an alternative output mode for fast charging, depending on the discharge energy and power conditions of the power components.

For example, output mode 4 may be set as a default output mode for superfast charging. However, if the SoC of the local battery assembly is below a superfast-charging energy threshold or is below a superfast-discharge rate threshold required for a requested superfast charging, for example, the local battery assembly does not have a useable energy which is sufficient to complete a requested superfast-charging or a discharge rate which is fast enough to meet a charging time requirement of the specific superfast-charging request, the controller will select output mode 5 as an alternative output mode for superfast-charging. On the other hand, if the first power component, that is, the power supply at input 1 in the example, is not available when a superfast-charging is requested, the controller will select output mode 6 as an alternative output mode for superfast-charging.

Since the controller is to perform status update checks from time to time, the controller has updated information on the power and energy status of each one of the power components, before, at the time, and after a charging request is made, the controller will according to the result of the updated status checks select an alternative output power mode or change from an output mode to another output mode, for example, from a default mode to an alternative mode or from one alternative mode to another.

For example, if the SoC of all the power storage assemblies of all the member apparatuses are at the minimum stored energy of $E_{min}$ or below, only output modes 2, 3, 4, 6 are available for fast-charging or faster-charging.

On the other hand, if there is no live input power at input 1, the local battery assembly of a selected charging station is at 100% SoC, some or all of the neighboring power storage assemblies have 100% SoC, output modes 2, 6, 7 are available for output mode selection.

In general, if the supply at input 1 is normal, the local battery assembly is at 100% SoC, and the SoC of at least some of the battery assemblies of neighboring apparatus in the idling state is at 100% SoC, output modes 1 to 7 are available for power output.

The actual power output mode used are internal operations of the apparatus and is usually not visible to a user.

In general, the power output mode is selected by the controller according to the charging speed option selected or requested as well as the power and energy distribution status of the network.

Where a battery assembly has a useable stored energy capacity of E (kwh) and requires q hours of charging at $P_1$ to bring the energy of the battery assembly from $E_{min}$ to $E_{max}$, the maximum useable energy $E=qP_1$, where q is a positive real number. In example embodiments, input A of the apparatus is connected to a power source having a constant power $P_1$(kw), the battery requires q hours to charge up. A battery assembly has a maximum useable discharge rate (or maximum discharge rate in short) of $P_{Discharge\_max}$. The maximum useable discharge rate is a power discharge rate at which the battery assembly remains in safe operation during the entire operation time, for example, without overheating. The maximum useable energy E of a power storage assembly and the maximum discharge rate of $P_{Discharge\_max}$ are related by the relationship $E=T\ P_{Discharge\_max}$, where T is a positive real number and has a unit of time in hours. Therefore, a power storage assembly having a stored energy of E would be sufficient to provide an output power at the maximum discharge rate $P_{Discharge\_max}$ for T (hours). Where $P_{Discharge\_max}=rP_1$, $T=q/r$, r being a positive real number. In general, a higher ratio of q/r would mean a more powerful and flexible power supply apparatus 100. However, q is dependent on the maximum energy storage capacity of a power storage assembly, a higher value of usually means a bulkier and a more expensive assembly. In general, a value of q larger than or equal to 2, a value of r larger than or equal to 2, and a value of T larger than 0.5 would provide a good entry level power supply apparatus 100.

Where a network has N networked power supply apparatuses 100, N being a natural number, the total maximum power $P_T$ which is available for output from the network would be (r+1) (N) $P_1$. Although a battery assembly can be discharged at the maximum discharge rate, a discharge rate of below the maximum is always preferred to ensure an extended service life and the actual power discharge rate of a battery assembly is controlled by the BMS. In the example network, where the second power input, input B, is connected to output 2s of the member apparatus, the maximum possible available input power input at input B is (r+1) (N−1) $P_1$, and in general, $P_1 \leq P_2 < (r+1)$ (N−1) $P_1$.

Many battery assemblies are assembled from battery modules and each battery module typically comprises a plurality of n cells in series connection (nS) and a plurality of m battery cells in parallel connection (mP). Many battery modules of EV are assembled from lithium cells, for example, 18650-sized lithium cell. An example 18640 lithium cell has $V_{max}$ of about 4.1V, $V_{min}$ of about 2.65V, a nominal voltage of about 3.6V, a nominal capacity of 2.55 Ah, maximum 10 A discharge current. An example nS battery assembly where n=14 has a nominal voltage of 50.4V and a voltage range of between 37.1V and 57.4V. An example battery assembly comprises an example plurality of seven battery modules connected in series so that the battery assembly has a voltage which varies between 260V at $V_{min}$ and $E_{min}$ and 401.8V at $V_{max}$ and $E_{max}$, and a useable energy capacity of 14 kWh. The output voltage at Output 1 is defined by the power converter 144 which converts and/or regulates the battery voltage to an output voltage compatible with the specific requirement of the EV requesting charging. The charging voltage requirements of typical EV are in the region of 450V-500V.

Assuming the battery assembly has a q value of 2 hours and an r value of 4, so that $E=2P_1$ hours, and $P_{Discharge\_max}=4P_1$, and the first power source is a rectified 3-phase running power supply at $P_1=7$ kW(for example, at 220V and 31 A per phase), the battery assembly would require two hours to charge from $E_{min}$ to $E_{max}$, but can discharge in a minimum time of 0.25 hour.

For the example, when output mode 3 is selected, the maximum charging power that can be outputted from the battery assembly, is $4P_1$, and the charging power due to the first power source is $P_1$. Therefore, the maximum charging power that can be supplied by the apparatus is $5P_1$, although the controller can adjust the output power rate to well below the maximum.

When output mode 4 is selected, the maximum charging power that can be supplied by the apparatus is $5P_1+P_2$, where $P_2$ is power due to neighboring power supply apparatuses, although the controller can just the output rate to well below the maximum. The theoretical maximum of $P_2$ is $5(N-1) P_1$, where N is the number of member apparatus in the network. For the example of FIG. 4, N=3 and the maximum power output from an apparatus can be 5N(=15) $P_1$, which is the total maximum available power output $P_T$ of the network. Table 2 below sets out relationship between maximum output power and the power components which form output power.

TABLE 2

| Output mode # | Power components | | | Max power output |
|---|---|---|---|---|
| | P1 | P2 | P3 | |
| 1 | ✓ | X | X | $P_1$ |
| 2 | X | X | ✓ | $rP_1$ |
| 3 | ✓ | X | ✓ | $(r + 1)P_1$ |
| 4 | ✓ | ✓ | ✓ | $(r + 1)P_1 + P_2$ |
| 5 | ✓ | ✓ | X | $P_1 + P_2$ |
| 6 | X | ✓ | ✓ | $rP_1 + P_2$ |
| 7 | X | ✓ | X | $P_2$ |

In general, a value of q which is between 2 and 12 would be a good balance. For example, a value of q=2 would be good for a busy car park which has a short idling time while a larger value of q, say q=10, would be good for an office car park which has a long idling time. Where the apparatuses 100 are in a location having a three-phase power supply, the network may comprise three member apparatuses or clusters of subnetworks each having three member apparatuses to maximize usage of the three-phase power supply.

Of course, N can be larger or smaller than 3, and the energy storage capacity of a battery assembly $qP_1$ can be increased or decreased without loss of generality. The value of N does not have a theoretical limit and the network is highly scalable. In general, N can be between 1 for an individual car park owner 2-10 for a medium car park operator, and can be more than 100 for a large-scale car park operator. In practice, the maximum number of switchable paths at input B may impose a practical limit of N for a single network.

Assuming the network is in the idling state and a first EV, say at CP1, requests for charging. The network controller on completing admission procedures would begin to supply a charging power $P_{CP1}$ ito the first EV according to the requested charging speed. While the first EV is being charged, the maximum charging power available for a new corner would be the total maximum available power output $P_T$ of the network minus the charging power $P_{CP1}$ being supplied to the first EV, and the network controller would provide charging options available to other member apparatus according to the instantaneously available total charging power, which is $P_T-P_{CP1}$.

While the first EV is being charged, a second EV, say at CP2, requests for charging. The network controller on completing admission procedures would begin to supply a charging power $P_{CP2}$ to the second EV according to the requested charging speed. While the first and second EV are being charged, the maximum charging power available for a new corner would be the total maximum available power output $P_T$ of the network minus the charging power, that is $P_{CP1}+P_{CP2}$, being supplied to the first and second EV, and the network controller would provide charging options available to other member apparatus according to the instantaneously available total charging power, which is $P_T-P_{CP1}-P_{CP2}$.

When a third EV request for charging, say at CP3, the network controller will similarly provide charging speed options according to the total maximum power remaining available from the network.

When the first and/or the second EV and/or the third has completed charging and no new vehicle requests for charging, the network will resume to the idling state.

When a vehicle is being charged and a charging station becomes available, the network would not return to the idling state and will remain in the power output state until all the charging states are not outputting charging power to an EV.

With vehicles coming and going, the total maximum charging power available from the network may drop below the original maximum and the network controller would need to be updated and the network controller would according to the updated maximum charging power available and the power distribution to determine the charging speed options available and the optimal output modes to be used.

In example embodiments, the power storage assembly 120 and the power-and-control circuitry 140 are rack-mounted inside a cabinet, for example, a steel cabinet. The power storage assembly 120 comprises a plurality of battery modules, and each battery module is mounted on a battery rack. The power circuitries and control circuitries are mounted respectively on a power rack and a controller rack. The power circuitries of the master apparatus comprise a 3-phase AC/DC converter in its power input circuitry, with one rectified phase serving as a first power source of the master apparatus and two rectified phases for output to neighboring apparatuses. The example slave apparatuses are configured to receive power supply at input A from the master apparatus and a has a DC power input circuitry.

Figure 5:
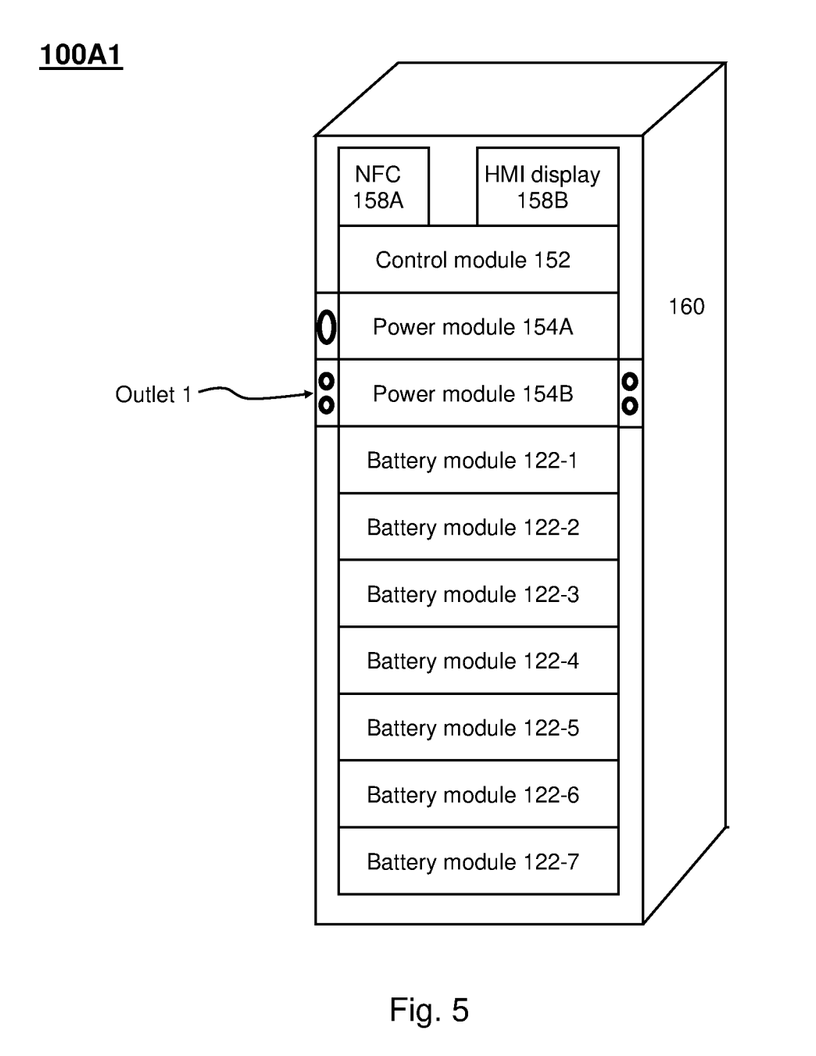
FIG. 5 is a schematic diagram of an example power supply apparatus 100.

An example an apparatus 100 comprises control circuitries which are arranged into a control module 152, power circuitries which are arranged into power circuitry modules comprising a first power-circuitry module 154A and a second power-circuitry module 154B, a battery assembly arranged into a plurality of interconnected battery modules 122-1 to 122-7, and a UI frontend comprises an NFC frontend 158A and a display 158B, a main housing which is a column-type cabinet 160 made for example of steel and/or aluminum, and a power output port Output 1 which is mounted on the cabinet 160, as shown in FIG. 5. The cabinet has a top end, a bottom end and a peripheral wall which cooperates with the top end and the bottom end to define a cabinet compartment. The modules are racked mounted in a vertical order to form a stack of modules and a column-type charging station to minimize its cross-sectional or base area. The battery assembly is heavy and forms the bottom of the stack. The control circuitries form the top of the stack and the power circuitries are intermediate the control circuitries and the battery assembly. The NFC frontend and the display are mounted on or near the top end of the cabinet and are at about the eye level of an average adult, for example, at between 1.6 m and 2 m above ground.

The example apparatus is configured as a master apparatus 100A1. The first power circuit module comprises a 3-phase AC-DC power converter. The 3-phase AC-DC power converter has three DC power outputs. When the apparatus 100A1 is deployed in a network, the three outputs are configured to supply power to three apparatuses, including itself. When the apparatus 100A1 is deployed in a standalone (i.e., non-networked) environment, one, two or all of the DC outputs may be configured to supply power to itself. The second power circuitry module comprises a DC-DC converter, a power router, a power adder, and peripheral power circuitries such as power stabilizers, switching circuitries, power inlets and power outlets. The power inlets and outlets comprise a first power inlet, a second power inlet, a first power outlet, and optionally a second power outlet. The first power output on the module is connected to the Output 1, which is mounted on the cabinet. Where the apparatus is configured as a charging station for charging different mobile loads, the main power output of the apparatus is configured for repeated charging of different mobile loads. The repeated charging of different mobile loads requires repeated connection to and repeated disconnection from different mobile loads and such repeated connection and disconnection are likely to repeatedly induce mechanical stresses and tensions on the main power output. The mounting of Output 1 as an intermediate port mitigates direct mechanical stresses and tensions on the power module and is preferred. The other power inputs and outlets of the modules are otherwise configured for permanently electrical connection and may not require an intermediate connection on the cabinet. On the other hand, a connection panel may be mounted on the cabinet to make the permanent electrical connections better organized. The control module comprises a master controller, a local BMS and peripheral circuitries required to perform network control and control of the AC-DC power converter. The NFC frontend 158A provides a user-interface for a user to interact with the apparatus such as to effect electronic wireless payments and the display 158B may be a touch-panel which is configured as a human-machine interface (HMI) which is to provide visible display to facilitate user-machine interaction.

Where the apparatus is configured as a slave apparatus and not a master apparatus, the apparatus is configured as a basic apparatus which comprises a single power-circuitry module (without the module comprising the DC-DC converter) and a control module having a slave controller rather than a master controller.

The voltage of a battery assembly changes as its stored energy level changes. A battery assembly is to change from a voltage $V_{min}$ at $E_{min}$ when the battery assembly is fully discharged to its set working minimum to a voltage $V_{max}$ at $E_{max}$ when the stored energy is fully charged to its set maximum. When a battery assembly is to output stored power, the voltage of the battery assembly decreases as the stored energy level falls. When a battery assembly is charged, the voltage of the battery assembly increases as the stored energy level rises. Since the battery assembly is a variable voltage device having a battery assembly voltage which is variable between $V_{min}$ and $V_{max}$ during an operation cycle, the apparatus may comprise a voltage stabilizing means such as voltage regulators to provide a regulated power output.

In some embodiments, the battery assembly comprises built-in switching circuitries which are configured to devise a power input path and a power output path isolated from the power input path, and output voltage stabilizing circuitries to regulate output voltage of the battery assembly, for example, to the same voltage as the voltage at input A.

In example embodiments, the power converter 144 comprises a first circuitry portion having a first input which is connected to the battery assembly or the output path of the battery and a second circuitry portion having a second input which is connected to input A and which is electrically isolated from the first input. The first circuitry portion may comprise a voltage regulator which is to regulate the voltage of the battery assembly to a voltage suitable for combining the first power component and the third power component at the power converter for output by the power converter.

In some embodiments, for example, embodiments where the apparatus is configured to provide different output voltages to conform with different charging voltage requirements of different mobile vehicles, the power converter is configured for a variable output voltage. The variable output voltage may be, for example, an output voltage which is programmable and/or an which is selectable by the controller from a plurality of available preset output voltages.

In example embodiments, the power combiner 146 comprise a first input circuitry portion having a first input which is connected to the output of the power converter 144 and a second input circuitry portion having a second input which is connected to input B and which is electrically isolated from the first input. The first circuitry portion of the power combiner 146 may comprise a first voltage regulator which is to regulate the output voltage of the power converter 144 to a voltage suitable for combining with power coming in from input B at the power combiner or suitable for straight output at output 1 and/or output 2. The second circuitry portion may comprise a second voltage regulator which is to regulate the output voltage of the power component coming in from input B to a voltage suitable for combining with power coming in the power converter 144 at the power combiner or suitable for straight output at output 1 and/or output 2.

In example embodiments, the power combiner 146 comprise a first output circuitry portion which is connected to Output 1 and a second output circuitry portion which is connected to Output 2. The second output circuitry portion is isolated from the first output circuitry portion and has a voltage regulator configured for variable or adjustable voltage output.

In example embodiments, the power converter 144 comprises a first circuitry portion having a first input which is connected to the battery assembly or the output path of the battery and a first output which is connected to an input of the power combiner 146, a second circuitry portion having a second input which is connected to input A and which is electrically isolated from the first input and a second output which is isolated from the first output and which is connected to another input of the power combiner 146; and the power combiner has a first voltage regulator and a second voltage regulator for regulate voltage of the power components coming from the power router 148 for combining at the power combiner 146; a third voltage regulator for regulating output voltage of the power combiner 146 to a voltage suitable for output at Output 1, and a fourth voltage regulator for regulating output voltage of the power combiner 146 to a voltage suitable for output at Output 2.

In example embodiments, the battery assembly comprises a voltage regulator in its power output path so that the power converter does not need to provide a voltage regulator for regulating voltage of a power component due to the battery assembly.

Some or all of the voltages at Output 1, Output 2 and Input B can be different.

For example, when a first EV requiring a first charging voltage V1 is being charged by a first charging station, a second EV requiring a second charging voltage V2 higher than V1 is being charged by a second charging station, and a third EV requiring a third charging voltage V3 higher than V2 is being charged by a third charging station, the output voltages at Output 1 of the first, second and third charging stations are, respectively, V1, V2, V3, wherein V1<V2<V3.

Assuming the second charging station has spare power to supplement the first charging station, the network controller may control the power combiner 146 of the second charging station such that the output voltage at Output 2 of the second charging station is at V1 while the output voltage at Output 1 is V2. Alternatively, the network controller may operate to control the power combiner 146 of the second charging station such that the output voltage at Output 2 of the second charging station is at V2, and therefore the input voltage at Input B of the first charging station is at V2, and to control the input circuitry of the power combiner 146 of the first charging station such that the second voltage regulator is to output a voltage of V1 to the power combiner 146 of the first charging station.

In example operations, the second charging station may receive input power at V3 from the third charging station, output power at V1 to the first charging station and output power at V2 at Output 1.

The present disclosure is made with a description of examples and embodiments with reference to the figures. The examples, embodiments and figures are not intended to limit scope of the disclosure. For example, while the power circuitries of the example apparatus 100 are formed as a power module rack-mounted within a main housing, the power circuitries may be distributed mounted, for example, with parts inside and/or outside the main housing. For example, the power adder etc. of the power output circuitry may be mounted outside of the main housing to form a matrix of switches suitable for a more flexible network power connection.

The invention claimed is:

1. A power supply apparatus comprising a battery assembly, control circuitries, and power circuitries, the power circuitries comprising a power input circuitry, a power output circuitry, and a charging circuitry;
    wherein the power input circuitry is configured for connection with a plurality of external power sources, and comprises a first input circuitry configured for connection to a first external power source and a second input circuitry configured for connection to a second external power source, the first external power source and the second external power source being separate and independent power sources;
    wherein the power output circuitry comprises a first power output port which is configured for connection to a first external load;
    wherein the charging circuitry is configured for charging the battery assembly;
    wherein the power circuitries are operable to combine two or more power components selected from a group of power components for power output by the apparatus, the group of power components comprising a first power component which is a power component due to the first external power source, a second power component which is a power component due to the second external power source, and a third power component which is a power component due to the battery assembly which is an internal power source;
    wherein the control circuitries comprise a controller, a data communication frontend, a user-interface frontend, and battery management circuitries; and
    wherein the controller is configured to perform data communication with an external power source of the plurality of external power sources to facilitate control and management thereof or thereby, and the external power source is a charging station comprising a battery assembly, a local battery management system and an EV charging gun.

2. The apparatus of claim 1, wherein the power supply apparatus is configured as a master apparatus and the controller is configured as a master controller operable to collect data from the external power source, the data to be collected including one or more of: identity, SoC, energy storage capacity, input port connection status, output port connection status, power supply status, and general circuitry conditions of the external power source.

3. The apparatus according to claim 1, wherein the power circuitries comprise a switchable power combiner which is operable in a plurality of switching states to selectively combine the plurality of power components for output from the apparatus, and wherein the first power component, the second power component and the third power component are selectively combinable by switched operations of the power combiner.

4. The apparatus according to claim 1, wherein the first input circuitry comprises a switchable power router which is operable in a plurality of routing states to define a plurality of power paths, the plurality of power paths comprising a first power path which connects the first input circuitry to the battery assembly, a second power path which connects the battery assembly to the power output circuitry, and a third power path which connects the first input circuitry to the power output circuitry; and wherein the first power component is to flow along the first power path and the second power component is to flow along the second power path; and/or wherein the controller is configured to operate the power router in a plurality of routing states, comprising a first routing state in which only the first power path is conductive, in a second routing state in which only the second power path is conductive, in a third routing state in which only the third power path is conductive, and a fourth routing state in which both the second and third power paths are conductive; and/or wherein the power circuitries comprise a power converter having a power input and the power router has a power output which is tied to the power input of the power converter, and wherein the power converter has a power output which is tied to a power input of the power output circuitry.

5. The apparatus according to claim 1, wherein the controller is configured to operate the apparatus in an idling state or in a power output state; wherein, in the idling state, the controller is to operate the power circuitries to charge the battery assembly only until the battery assembly is fully charged; and wherein, in the power output state, the controller is to operate the power circuitries to output power from the apparatus in response to a machine instruction containing a charging speed parameter.

6. The apparatus of claim 2, wherein the first power output port is configured for EV charging, and the power output circuitry comprises a second power output port which is configured for connection to a second external load which is an EV charging station comprising a battery assembly, a local battery management system and an EV charging gun; and wherein the master controller is configured to collect data from the second external load, the data to be collected including one or more of: identity, SoC, energy storage capacity, input port connection status, output port connection status, power supply status, and general circuitry conditions of the second load.

7. The apparatus according to claim 5, wherein the controller is to initialize the apparatus in the idling state and to switch the apparatus from the idling state to the power output state upon receipt of a machine instruction, and wherein the controller is to generate the machine instruction in response to a request from the user-interface frontend or from the communication frontend; and wherein the controller is configured to repeatedly perform updated status checks and collect updated status data on EV charging stations in data communication with the controller, and to prepare updated status information.

8. The apparatus of claim 3, wherein the first input circuitry is configured for connection to mains supply and the second input circuitry is configured for connection to the second external power source which is another EV charging station comprising a battery assembly, a local battery management system and an EV charging gun; and wherein the controller is configured as a master controller operable to collect data from the second external power source, the data to be collected including one or more of: identity, SoC, energy storage capacity, input port connection status, output port connection status, power supply status, and general circuitry conditions of the second external power source.

9. The apparatus of claim 4, wherein the master controller is configured to control and manage the second external power source so that surplus power is output by the second external power source to the master apparatus or another EV charging station which is data connected with the master apparatus.

10. The apparatus of claim 1, wherein the power supply apparatus is configured as a slave apparatus and the controller is configured as a slave controller configured to exchange data with a master controller of a master apparatus, wherein the slave controller is configured to send data to a master apparatus to facilitate its control and management, wherein the slave apparatus is an EV charging station including a battery assembly, a local battery management system and an EV charging gun, and wherein the data to be sent include one or more of: identity, SoC, energy storage capacity, input port connection status, output port connection status, power supply status, and general circuitry conditions of the slave apparatus.

11. The apparatus according to claim 10, wherein the slave controller is configured to operate the power circuitries to select only the first power component for power output from the apparatus upon receipt of a machine instruction containing a second charging speed which is slower than the first charging speed; and/or wherein the slave controller is configured to output state of charge (SoC) information of the battery assembly through the data communication frontend upon receipt of polling signals.

12. The apparatus of claim 10, wherein the first power output port is configured for EV charging, and the power output circuitry comprises a second power output port which is configured for supplying surplus power to another EV charging station which is data connected with the master apparatus or to the master apparatus.

13. The apparatus of claim 10, wherein the first input circuitry is configured for connection to mains supply and the second input circuitry is configured for connection to the second external power source which is another EV charging station comprising a battery assembly, a local battery management system and an EV charging gun; and wherein the controller is configured as a master controller operable to collect data from the second external power source, the data to be collected including one or more of: identity, SoC, energy storage capacity, input port connection status, output port connection status, power supply status, and general circuitry conditions of the second external power source.

14. The apparatus of claim 10, wherein the master apparatus is a charging station comprising a battery assembly, control circuitries, and power circuitries, the power circuitries comprising a power input circuitry, a power output circuitry, and a charging circuitry;

wherein the power input circuitry is configured for connection with a plurality of external power sources, and comprises a first input circuitry configured for connection to a first external power source and a second input circuitry configured for connection to a second external power source, the first external power source and the second external power source being separate and independent power sources;

wherein the power output circuitry comprises a first power output port which is configured for connection to a first external load;

wherein the charging circuitry is configured for charging the battery assembly;

wherein the power circuitries are operable to combine two or more power components selected from a group of power components for power output by the apparatus, the group of power components comprising a first power component which is a power component due to the first external power source, a second power component which is a power component due to the second external power source, and a third power component which is a power component due to the battery assembly which is an internal power source;

wherein the control circuitries comprise a controller, a data communication frontend, a user-interface frontend, and battery management circuitries; and wherein the controller is configured to perform data communication with an external power source of the plurality of external power sources to facilitate control and management thereof or thereby, and the external power source is a charging station comprising a battery assembly, a local battery management system and an EV charging gun.

15. A method of forming a network of a plurality of EV charging stations, wherein an EV charging station of the plurality of EV charging stations is a member apparatus which is a power supply apparatus comprising a battery assembly, control circuitries, and power circuitries, the power circuitries comprising a power input circuitry, a power output circuitry, and a charging circuitry;

wherein the power input circuitry is configured for connection with a plurality of external power sources, comprising a first input circuitry configured for connection to a first external power source which supplies AC mains power and a second input circuitry configured for connection to a second external power source, the first external power source and the second external power source being separate and independent power sources;

wherein the power output circuitry comprises a first power output port which is configured for connection to a first external load which is an EV and a second power output port;

wherein the charging circuitry is configured for charging the battery assembly;

wherein the power circuitries are operable to combine two or more power components selected from a group of power components for power output by the apparatus, the group of power components comprising a first power component which is a power component due to the first external power source, a second power component which is a power component due to the second external power source, and a third power component which is a power component due to the battery assembly which is an internal power source;

wherein the control circuitries comprise a controller, a data communication frontend, a user-interface frontend, and battery management circuitries; and wherein the controller is configured to perform data communication with an external power source of the plurality of external power sources to facilitate control and management thereof or thereby, and the external power source is a charging station comprising a battery assembly, a local battery management system and an EV charging gun; and wherein the method comprises connecting the second output port of one EV charging station to the second input circuitry of another EV charging station.

16. The method of claim 15, wherein the method comprises configuring the controller of one EV charging station of the network as a master controller to control and manage operations of member power supply apparatuses of the network, and configuring the controllers of other EV charging station of the network as a slave controller to cooperate with the master controller.

17. The method of claim 16, wherein the method comprises configuring the master controller to repeatedly perform updated status checks and collect updated status data on the member power supply apparatuses which are in data communication with the controller, and to prepare updated status information for control and management of the network.

18. The method of claim 16, wherein the method comprises configuring the master controller to control a member apparatus so that surplus power of that member apparatus is output for use by another member apparatus.

19. The method of claim 16, wherein the method comprises configuring the master controller to control a member apparatus to supply power to another member apparatus for output by that another member apparatus.

20. The method of claim 16, wherein the method comprises configuring the master controller to collect data from the member apparatuses, the data to be collected including one or more of: identity, SoC, energy storage capacity, input port connection status, output port connection status, power supply status, and general circuitry conditions of the member apparatuses.

* * * * *